United States Patent [19]

Suzuki et al.

[11] Patent Number: 4,951,152
[45] Date of Patent: Aug. 21, 1990

[54] CIRCUIT FOR CONTROLLING THERMAL ARRAY RECORDING HEAD

[75] Inventors: Kiyosuke Suzuki, Saitama; Michihiro Hino, Kanagawa, both of Japan

[73] Assignee: Sony Corporation, Tokyo, Japan

[21] Appl. No.: 95,230

[22] Filed: Sep. 11, 1987

[30] Foreign Application Priority Data

Sep. 18, 1986 [JP] Japan .................. 61-220196

[51] Int. Cl.$^5$ ............... G01D 15/10; H04N 1/23; B41J 2/36
[52] U.S. Cl. ................ 358/298; 346/76 PH; 400/120; 219/216
[58] Field of Search ............ 346/76 PH; 358/296, 358/298; 400/120; 219/216 PH, 216; 341/145, 152; 332/9 R; 307/265; 375/22

[56] References Cited

U.S. PATENT DOCUMENTS

| | | | |
|---|---|---|---|
| 3,668,560 | 6/1972 | Padalino | 332/9 |
| 4,310,831 | 1/1982 | Henderson | 340/347 |
| 4,355,319 | 10/1982 | Takeuchi | 346/76 PH |
| 4,443,121 | 4/1984 | Arai | 400/120 |
| 4,492,482 | 1/1985 | Eguchi | 346/76 PH |
| 4,777,496 | 10/1988 | Maejima | 346/76 PH |
| 4,802,105 | 1/1989 | Suzuki | 358/296 |
| 4,806,950 | 2/1989 | Sekine | 346/76 PH |
| 4,819,008 | 4/1989 | Nagato | 346/76 PH |

FOREIGN PATENT DOCUMENTS

| | | |
|---|---|---|
| 51-123511 | 10/1976 | Japan . |
| 57-14315 | 3/1982 | Japan . |
| 1114594 | 5/1968 | United Kingdom . |

Primary Examiner—Bruce A. Reynolds
Assistant Examiner—Scott A. Rogers
Attorney, Agent, or Firm—Ronald P. Kananen

[57] ABSTRACT

A PWM (Pulse Width Modulation) control circuit for printing apparata comprises a memory for storing digitized image data, a main converter connected to the memory for converting upper bits of the digitzed image data into a main pulse-width modulated signal based on a first unit time duration, a sub-converter connected to the memory for converting the rest of the bits of the digitized image information into a sub pulse-width modulated signal based on a second unit time duration, and a drive circuit connected to the main converter and sub-converter for generating the driving signal in accordance with the main pulse-width modulated signal and sub pulse-width mnodulated signal. The amount of transferred digital tone data per horizontal line of a whole printing screen is reduced and the color concentration characteristics of the thermal head are appropriately maintained within an acceptable range.

15 Claims, 4 Drawing Sheets

CIRCUIT FOR CONTROLLING THERMAL ARRAY RECORDING HEAD

BACKGROUND OF THE INVENTION

The present invention relates generally to a circuit for controlling thermal head elements of a thermal printing apparatus which modulates half-tone data of a video signal in a pulse width modulation (PWM) form and controls thermal head elements in a PWM mode. In a full color printer having a thermal head, a driving circuit for the thermal head controls heat generation of the thermal head elements through a pulse-width modulated signal (abbreviated as PWM signal) according to received half-tone data to provide different signals corresponding to the color densities.

Two methods have been adapted which drive the thermal head elements using such PWM signals.

One method is exemplified by the examined Japanese Pat. Publication JP No. 57-14315 published on Mar. 24, 1982.

In the above-identified Japanese Patent, a video image signal of an analog form is received by an A/D converter which converts the analog video signal into four-bit digital data in synchronization with a reference clock derived from a controller. A memory stores the digitally converted four-bit half tone-data into a predetermined memory area in response to a write command from the controller. The memory supplies the stored four-bit half-tone data to a shift register connected to the thermal head in response to the read signal from the controller. The data transfer from the memory to the shift register is carried out in such a way that respective most significant bit data (n data of bits "1" and "0") from the data for one horizontal line to be printed, i.e., the fourth bit of each data are at first serially supplied to the shift register. Upon the completion of the head driving based on the most significant bit of each of the n data for the line, respective second-most significant bit of each of the n-data (third-bit data) are then serially supplied thereto. In this way, the data transfer for one horizontal line is completed when respective the least significant bit of each of the data for the line are serially supplied thereto.

The controller outputs the reference clock to the A/D converter as described above and outputs a strobe signal to a latch-and-drive circuit. The latch-and-drive circuit latches the registered contents of the shift register for a duration corresponding to a pulse-width of the strobe signal, and supplies power to any head elements of the thermal head element group which correspond to bit portions of the register in which the bits "1" are registered. On the other hand, the latch-and-drive circuit does not supply the power to any other head elements which correspond to bit portions of the register in which the bits "0" are registered.

Each pulse-width of the above-described strobe signal is different depending on a weight of each bit of data. That is to say, the pulse-width of the strobe signal is 8d when the fourth-bit data is "1", 4d when the third-bit data is "1", 2d when the second-bit data is "1", and d when the first-bit date is "1". In this way, a signal corresponding to the color density of 16 tones can be provided with the sequential combination of the different pulsewidth strobe signals.

The other method is exemplified by the non-examined Japanese Patent Publication JOP No. 51-123511 published on Oct. 28, 1976.

In the above-identified latter Japanese Patent, the memory sequentially supplies the four-bit half tone data for one horizontal line to a comparator. In addition, a tone counter sequentially outputs sixteen reference tone signals for a first tone up to a sixteenth tone to the comparator. The comparator first compares each one of the four-bit tone data A in one horizontal line (n pixels), n four-bit data derived from the memory with the first reference tone signal B for the first tone derived from the tone counter. If $A \geq B$, the comparator produces a "1" logic signal. If $A < B$, the comparator produces a "0" logic signal. Either of those output signals is transmitted from the comparator to the shift register. Next, the four-bit tone data A in the corresponding horizontal line (n pixels) derived from the memory is again outputted to the comparator. The comparator, then, compares the tone data A with the reference tone signal B for the second tone derived from the tone counter. Either of the two output signals indicating the comparison results is then transmitted from the comparator to the shift register. The above-described comparing operation is repeated up to the sixteenth tone. The controller outputs the strobe signal having a relatively narrow pulse-width to the latch-and-drive circuit upon completion of the data transfer of the output signals from the comparator to the shift register. The latch-and-drive circuit latches the data registered in the shift register in response to a rising edge of the strobe signal and continues the latch of data until the following strobe signal rises. The latch-and-drive circuit continues to supply the power to the head elements if the next incoming data from the comparator indicates "1". Consequently, signals corresponding to color densities in sixteen tones can be provided.

However, the two methods disclosed into the two above-identified Japanese Patent Application documents have the respective drawbacks described below.

In the former method, since the amount of transferred data for each horizontal line is expressed as $4 \times n$ and the strobe signal is modulated in the pulse-width modulation mode depending on the weight of each bit, the drive pulse for the thermal head is formed in a discontinuous PWM signal, in which one drive pulse is separated in time from the other drive pulse in cases where the data of "1" are separately present. Therefore, the characteristics of the head elements are such that the drive pulse having the width d is activated after heat caused by the drive pulse having the width of 8d is almost dissipated. In addition, heat generation becomes reduced as compared with the case where the consecutive drive pulses having a continuous pulse-width of 9d activate the corresponding head elements. Hence, the appropriate, distortion-free thermal characteristics cannot be achieved.

On the other hand, in the latter method, the heat generation corresponding to each pulse-width of the drive pulses can be achieved since consecutive drive pulses are formed in the continuous PWM signal. Therefore, the appropriate distortion-free thermal characteristic can be achieved. However, the amount of transferred printing data for each horizontal line to the thermal heads is expressed as $16 \times n$, which is considerably greater than that $(4 \times n)$ in the former method. Therefor, if the number of tones is doubled, the amount of transferred data is doubled and accordingly the time required to print the tone data becomes doubled.

SUMMARY OF THE INVENTION

It is an object of the present invention to provide circuits and methods for controlling thermal heads of printing apparat which can maintain appropriate color density characteristics in the printed image and simultaneously achieve high-speed printing with a capability of transferring a reduced amount of tone data.

The above-described object can be achieved by providing a PWM control circuit for printing apparatus, comprising: memory means for storing digitized image informations; main-converting means connected to the memory means for converting upper bits of the digitized image information into a main pulse-width modulated signal based on a first unit time duration; sub-converting means connected to the memory means for converting the rest of the bits of the digitized image information into sub pulse-width modulated signals based on a second unit time duration; and drive circuit means connected to the main-converting means and sub-converting means for generating a head driving signal in accordance with the main pulse-width modulated signal and sub pulse-width modulated signal.

The above-described object can also be achieved by providing a circuit comprising: (a) first means for receiving digitized tone data and transferring the digitized tone data of each horizontal line of a whole printing screen to a thermal head of a printing apparatus, while maintaining a constant amount of transferred tone data per horizontal line of the whole printing screen irrespective of the analyzed number of tones; and (b) second means for maintaining a color concentration characteristic of a thermal head of a printing apparatus within an acceptable range according to magnitudes of the received digitized tone data.

The above-described object can also be achieved by providing a method for controlling a thermal head of a printing apparatus, comprising the steps of: (a) storing digitized image tone data (b) converting predetermined lower digits of the digitized tone data into a sub pulse-width modulated signal; (c) converting the rest of the digits of the digitized tone data into a main pulse-width modulated signal; and (d) generating a head driving signal for the thermal head in accordance with the main pulse-width modulated signal and sub pulse-width modulated signal.

BRIEF DESCRIPTION OF THE DRAWINGS

A more complete understanding of the present invention may be obtained from the following detailed description taken in conjunction with the attached drawings in which like reference numerals designate corresponding elements and in which.

DETAILED DESCRIPTION OF THE PREFERRED EMBODIMENTS

Reference will hereinafter be made to the drawings in order to facilitate an understanding of the present invention.

Figure 1:
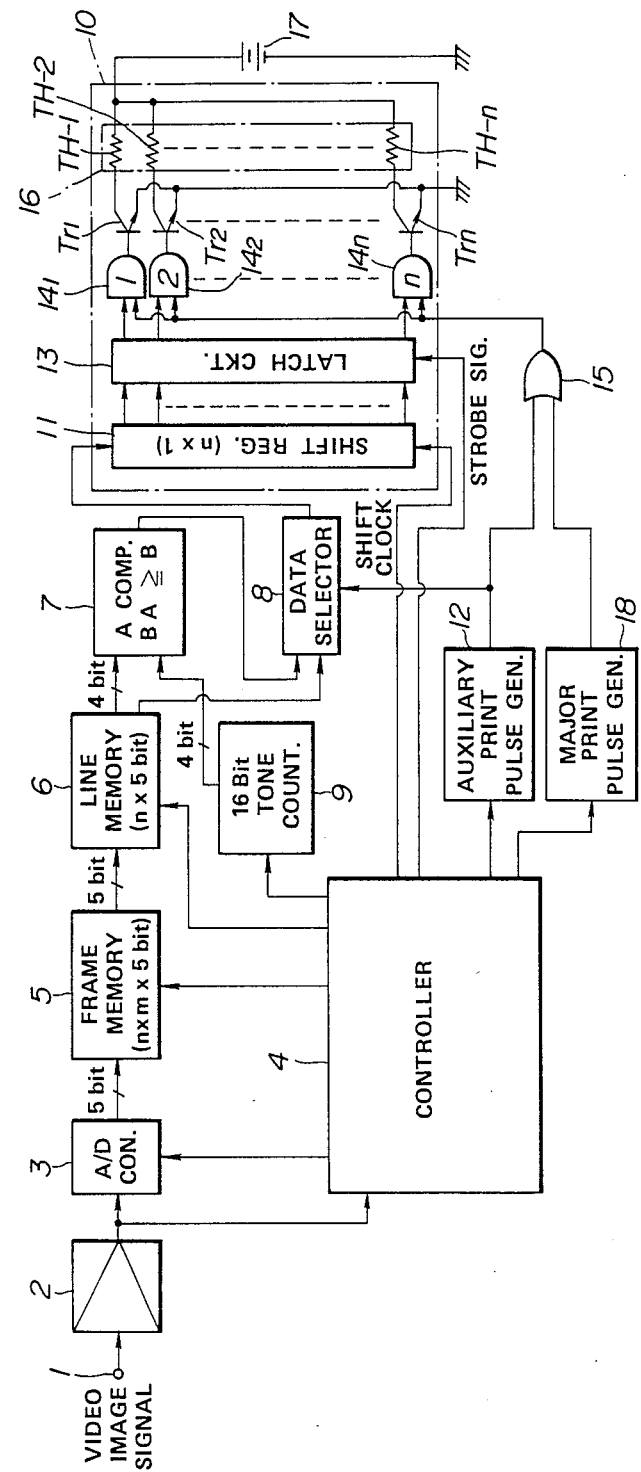
FIG. 1 is a simplified circuit block diagram of a firs red embodiment of a circuit for controlling a thermal head of a printing apparatus according to the present invention.

FIG. 1 shows a simplified circuit block diagram of a circuit for controlling a thermal head of a printing apparatus in a first preferred embodiment.

A video image signal of an analog form is supplied to an input terminal 1 of an amplifier 2.

The amplifier 2 amplifies the video image signal and the amplified video signal is supplied to an A/D (analog-to-digital) converter 3 and to a controller 4. The A/D converter 3 receives the reference clock from the controller 4 and converts the video image signal into a half-tone data constituted by a five-bit digital signal in synchronization with the reference clock. The five-bit digitally converted tone data is then transmitted to a frame memory 5 in a bit parallel form.

The frame memory 5 has a memory capacity which corresponds to one printing screen (n×m) of n dots in a horizontal direction and m dots in a vertical direction. The tone data (one dot=5 bits and expressed as n×m×5) for the whole print screen are stored in a predetermined memory area in response to a write signal derived from the controller 4.

A line memory 6 temporarily stores the tone data (one dot=5 bits and expressed as n×5 ) for one line in the horizontal direction of the printing screen. The line memory 6 supplies predetermined bits of tone data to a comparator 7 and to a data selector 8, the tone data being split as described below. That is to say, as shown in a signal timing chart of FIG. 2, the predetermined bits of the tone data (in this embodiment five bits) are split into a major bit portion A and a minor bit portion B. In the first preferred embodiment, the major bit portion A comprises the upper four bits and the minor bit portion B comprises the lower one bit. The major bit portion A is transmitted to the comparator 7 and the minor bit portion B is transmitted to a data selector 8.

A half-tone counter 9 sequentially outputs reference half tone signals representing each half tone from the first tone to the sixteenth tone in response to a control signal derived from the controller 4. The reference half-tone signal comprises four bits.

The comparator 7 compares the upper four-bit tone data derived from the line memory 6 with each of the reference half-tone signals derived from the tone counter 9. If the value of the tone data is greater than or equal to that of each reference half tone signal, the comparator 7 supplies an H (high level) signal to the data selector 8. If, on the contrary, the value of the tone data is less than that of the reference signal, the comparator 7 supplies an L (low level) signal to the data selector 8.

The data selector 8 selectively receives either the data from the line memory 6 or the output signal from the comparator 7. These data are selectively supplied to a shift register 11 of a thermal head portion 10. The selection of the input data of the data selector 8 is carried out by means of an auxiliary print pulse derived from an auxiliary print pulse generator 12 connected to the controller 4. The shift register 11 has a memory capacity (n×1 bits) capable of storing drive and non-drive bits of the information (the drive information is represented by the H signal and the non-drive information is represented by the L signal) for each of n head elements TH-1 to TH-n and stores the data supplied from the data selector 8 into a predetermined memory area thereof in response to a shift clock derived from the controller 4.

A latch circuit 13 latches the stored contents of the shift register 11 in response to a strobe signal derived from the controller 4 and supplies the stored contents to the respective AND gate circuits 14-1 to 14-n.

Each AND gate circuit 14-1 to 14-n receives an output signal of an OR gate circuit 15 and a corresponding drive information or non-drive information signal of the shift register 11. An output terminal of each AND gate circuit 14-1 to 14-n is connected to a base of a corresponding transistor $Tr_1$ to $Tr_n$.

Each transistor $Tr_1$ to $Tr_n$ is connected to a corresponding head element TH-1 to TH-n as a heat generating element via its collector and is commonly grounded via its emitter.

All of the thermal head elements TH-1 to TH-n together constitutes a head element group 16. That is to say, the head element group 16 is constituted by the n number of head elements corresponding to the number of dots for one line in the horizontal direction. A pulse-width of the auxiliary print pulse ("H" signal) is one-half of the narrowest pulse-width of the major bit portion A.

As described above, the controller 4 provides the strobe signal for the latch circuit 13. The strobe signal is provided upon the completion of transfer of all of the data (n) for one horizontal line from the data selector 8 to the shift register 11. While the data of the major bit portion A is transferred to the shift register 11, fifteen strobe signals are provided from the controller 4, the first strobe signal being derived at the same time the major print pulse generated from the major print pulse generator 18 rises, and the interval between the adjacent strobe signals being a constant d. Each head element TH-1 to TH-n is biased with a voltage of the power supply 17.

The major print pulse generator 18 supplies the "H" signal to the OR gate circuit 15 during an interval of time in which the data of the major bit portion A is transferred to the shift register 11, and the printing is carried out on the basis of that data.

Figure 2:
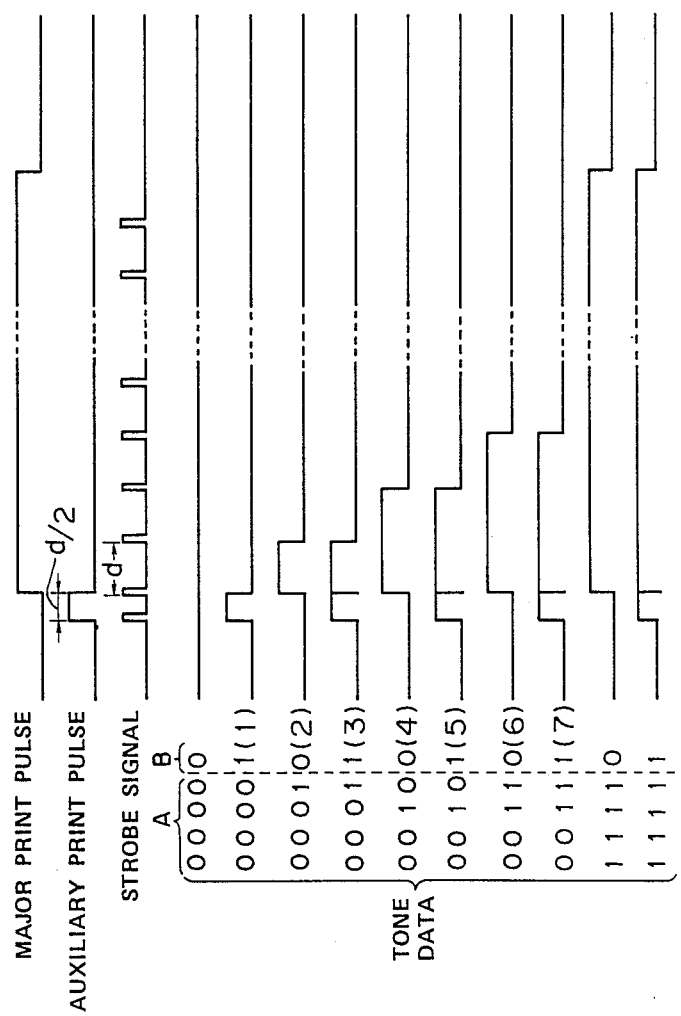
FIG. 2 is a signal timing chart of the essential parts of the circuit shown in FIG. 1.

The auxiliary print pulse generator 12 supplies the "H" signal to the OR gate circuit 15 and data selector 8 during an interval in which the data of the auxiliary bit portion B is transferred to the shift register 11 and the printing is carried out on the basis of that data value. The data of the auxiliary bit portion B for all n pixels is transferred at the same time that the auxiliary print pulse derived from the auxiliary print pulse generator 12 rises. When the drive data is latched by the latch circuit 13 in response to that strobe signal, the head elements TH-1 to TH-n are driven until the auxiliary print pulse falls. The pulse-width of the auxiliary bit portion B is one-half the narrowest pulse-width of the major bit portion A. Hence, as shown in FIG. 2, the tone data (00001) represents data of tone 1, the tone data (00010) represents data of tone 2, the tone data (00011) represents data of tone 3, . . . , respectively. Thus, drive pulses having a pulse-width in proportion to the magnitude of the tone data can be achieved.

Next, an operation of the circuit for controlling the thermal head of the printing apparatus in the first preferred embodiment will be described below.

The video signal inputted via the input terminal 1 is amplified by means of the amplifier 2 and transmitted to the A/D converter 3 and controller 4. The A/D converter 3 converts the video information signal into the tone data comprising the five-bit digital signal in synchronization with the reference clock. The tone data of a whole printing screen converted by means of the A/D converter 3 is stored into the frame memory 5. The tone data for a first horizontal line are transmitted to the line memory 6 for temporary storage. The tone data of the auxiliary bit portion B are, first, fetched from the line memory 6 into the data selector 8 in response to a read command signal of the controller 4 and are sequentially transmitted to the shift register 11. While all the one-bit data (the number of the one-bit data is n) for one horizontal line are transmitted to the shift register 11, the latch circuit 13 receives the strobe signal from the controller 4 and the auxiliary print pulse generator 12 generates and supplies an auxiliary print pulse to the data selector 8 and AND gates $14_1$ to $14_n$. When all the drive one-bit data are stored in all of the one-bit stages of the shift register 11, the latch circuit 13 latches that data in response to the rising edge of the strobe signal and supplies it to a corresponding ones of the AND gate circuits TH-1 to TH-n. Then, the corresponding ones of the AND gate circuits TH-1 to TH-n applies the base voltage signal to turn on all the associated ones of the transistors $Tr_1$ to $Tr_n$ during the receipt of the strobe signal is that the voltage of the power supply 17 is applied to the associated ones of the head elements TH-1 to TH-n. The supply of power supply 17 to the corresponding head elements TH-1 TH-n is continued until the auxiliary print pulse falls.

As soon as the auxiliary bit tone data is latched by the latch circuit 13, the major bit portion A of the tone data stored in the line memory 6 is sequentially transmitted to the comparator 7. The comparator 7 receives the reference half tone signal representative of the first tone from the tone counter 9 and compares the four-bit data of the major bit portion A with the reference tone signal. The comparator 7 outputs an "H" signal or an "L" signal depending on the comparison result via the data selector 8 to the shift register 11. When all data (n) for one horizontal line are transferred to the shift register 11, the strobe signal is transmitted to a latch circuit 13 and the major print pulse is generated from the major print pulse generator 18. Any head elements TH-1 to TH-n which correspond to any register bit portions in which the "H" signals are stored receive the voltage of power supply 17 and those in which the "L" signals are stored receive no voltage of the power supply 17.

When the data of the shift register 11 is latched in response to the strobe signal from the controller 4, the major bit portions A in the line memory 6 are again sequentially transmitted to the comparator 7. The comparator 7 receives the reference half-tone signal of the second tone from the half-tone counter 9 and compares each four-bit data of the major bit portion A with the reference half-tone signal. When the "H" or "L" signal representing the result of the comparison is transferred from the comparator 7 to the shift register 11 via the data selector 8, the data in the shift register 11 is updated and is latched in response to the subsequent incoming strobe signal. Any head elements TH-1 to TH-n which correspond to the register bit portions in which the drive data H are still stored continuously receive the voltage of the power supply 17. In addition, if the previous data H drive data and the present data are non-drive data L, the supply of the voltage from the power supply 17 to the corresponding head elements TH-1 to TH-n is interrupted at the time when the strobe signal rises.

When the second data is latched into the latch circuit 13, the magnitude comparator 7 compares the second data with the reference half-tone signal of the third tone. When the same operation is repeated and the magnitude comparison of both data and reference tone signal is carried out until the reference half-tone signal of the sixteenth tone is completed, the print operation for one horizontal line through the head elements is completed.

In the way described above, since in the first preferred embodiment each drive pulse is constituted by the continuous major pulse-width modulation portion constituted by the data of the major bit portion A coupled to the auxiliary pulse-width modulated portion constituted by the data of the auxiliary bit portion B, the heat generation characteristic controlled according to the magnitude of the tone data is achieved. Since, in the printing apparatus having a number of dots n for each horizontal line, the amount of data transfer in the auxiliary bit portion B required to transmit the five-bit tone data is n and that in the major bit portion A is 16×n (actually 15×n), the amount of transferred data becomes one-half that carried out in the latter method described in the BACKGROUND OF THE INVENTION since the amount of transferred data is effectively 16×2×n in the latter method.

Next, a second preferred embodiment of the circuit for controlling the thermal head of the printing apparatus according to the present invention will be described below.

The specific circuit configuration in the second preferred embodiment is almost the same as that in the first preferred embodiment shown in FIG. 1.

In the second preferred embodiment, the A/D converter 3 prepares the tone data comprise a six-bit digital signal. The tone data is then split into a major bit portion A comprising the upper four bits and an auxiliary bit portion B comprising the lower two bits. When the data of the most significant bit of the lower two bits of the auxiliary bit portion B is first transferred to the shift register 11, an auxiliary print pulse having one-half (½d) a narrowest pulse-width d of the major bit portion A is derived from the auxiliary print pulse generator 12. Then, while the least significant bit data is transferred from the data selector 8 to the shift register 11, an auxiliary print pulse having a pulse-width of ¼d, that is one-half that of the most significant bit of the bit portion B is derived from the auxiliary print pulse generator 12.

The operation of the second preferred embodiment will be described below with reference to FIG. 3.

Figure 3:
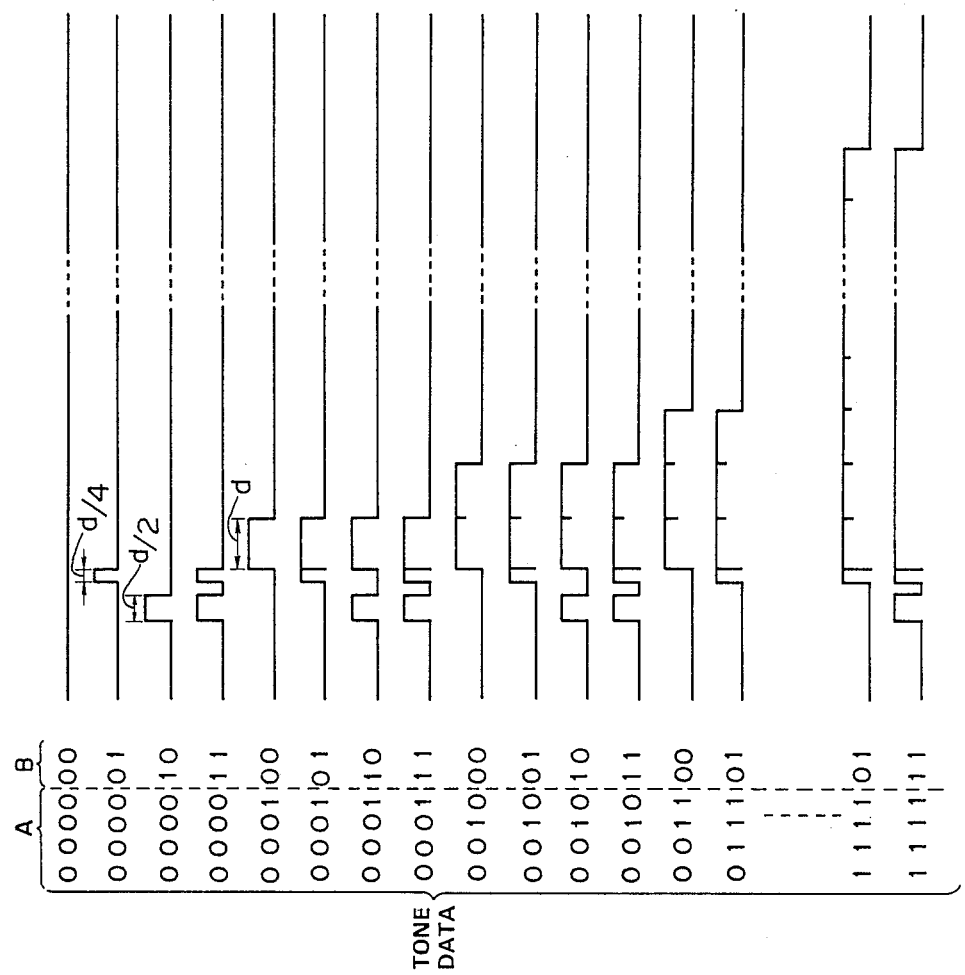
FIG. 3 is another signal timing chart of the essential parts of the circuit for controlling the thermal head of the printing apparatus in a second preferred embodiment.

As shown in FIG. 3, the tone data (000001) represents the first tone, the tone data (000010) represents the second tone, and the tone data (000011) represents the third tone, ..., respectively. Therefore, the drive pulses having pulse-widths which vary in proportion to the magnitude of the tone data can be achieved.

In the second preferred embodiment, the auxiliary drive pulse portions of each drive pulse produced from the auxiliary bit portion B become discontinuous according to the pulse-widths of the auxiliary bit portion but do not become extremely separated from each other as shown in FIG. 3. Therefore, the heat generation corresponding to the tone data can be achieved. In addition, since in the printing apparatus having the number of dots n for each horizontal line the transferred data of the auxiliary bit portion B required to transmit the tone data constituted by the six bits amounts to 2×n and the transferred data of the major bit portions A amounts to 16×n (actually 15×n), the amount of transferred data for each horizontal line is about one-third that in the case of the latter method described in the BACKGROUND OF THE INVENTION since the transferred data in the latter method amounts to 16×6×n.

Figure 4:
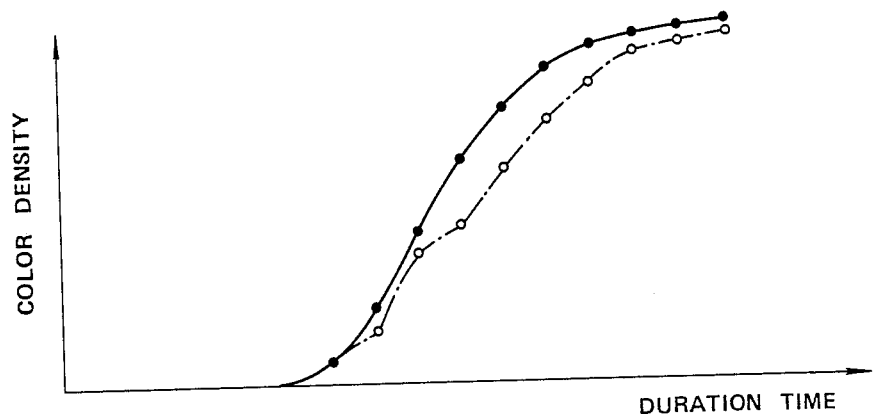
FIG. 4 is a graph of the color density characteristics of the printer according to the present invention.

FIG. 4 shows the color density characteristics of the printed image with respect to the time duration of the supplying of power from the power supply to a thermal head element. As denoted by the solid line in FIG. 4, the color density is increased substantially in proportional to the time duration in the case of the present invention. However, as denoted by a dot-and-dash line shown in FIG. 4, the color concentration characteristics are out of the acceptable range defined by the solid line of FIG. 4.

Since in the circuit for controlling thermal heads of the printing apparatus according to the present invention, the tone data constituted by the digital signal of a plurality of bits is split into the major bit portion and the auxiliary bit portion, the pulse-width modulation for the major bit portion is carried out through the comparison between the major bit portion and each reference tone signal representing the corresponding one of the tones, the pulse-width modulation for the auxiliary bit portion of the tone data is carried out depending on a weight of each bit of the auxiliary bit portion, the pulse-width of the auxiliary bit portion in each bit being gradually narrowered by one-half the narrowest pulse-width of the major bit portion, and the drive pulse for each head element of the printing apparatus is constituted by the pulses of the major and auxiliary bit portions, the amount of transferred tone data per horizontal line is decreased with the color concentration characteristic appropriately maintained so that the high-speed processing of the printing apparatus can be achieved.

What is claimed is:

1. A pulse width modulation (PMW) control circuit for a printing apparatus, comprising:
   memory means for storing digitized image information, wherein each dot of said image information has predetermined bits of gray scale data;
   main converter means connected to said memory means for converting upper bits of each said dot data of said digitized image information into a main pulse-width converting signal based on a first unit time duration;
   sub-converting means connected to said memory means for converting the rest of the bits of each said dot data of said digitized image information into a sub pulse-width converting signal based on a second unit time duration, wherein said first unit time duration is longer than said second unit time duration; and
   drive circuit means connected to said main-converting means and sub-converting means for generating a PWM head driving signal in accordance with said main pulse-with converting signal and said sub pulse-width converting signal.

2. A PMW control circuit as recited in claim 1, wherein said main-converting means includes a half-tone generator for generating reference half-tone signals, and a magnitude comparator which is conected to said memory means and said half-tone generator.

3. A PWM control circuit as recited in claim 2, wherein said sub-converting means includes a data selector connected to said memory means and said magnitude comparator of said main-converting means for adding said sub pulse-width converting signal to said main pulse-width converting signal based on the bit status of the rest of the bits of said digitized image information.

4. A PWM control circuit as recited in claim 3, wherein said drive circuit means includes a shift register connected to said data selector of said sub-converting means.

5. A circuit comprising:
(a) first means for receiving digitized tone data of p bits for each pixel of an n-by-m-pixel image frame and for transferring corresponding digital output data for each horizontal line of n pixels of said image frame to a group of n thermal elements of a thermal head of a printing apparatus for printing each horizontal line of said frame, wherein a predetermined number q of the most-significant bits of said digitized tone data, for each said pixel of each respective line, are repeatedly compared with each level of a plurality of 2 to the power of q reference tone levels, and the results of said comparisons are provided as respective parts of said digital output data, and at least one lower bit of each said tone data for each said pixel is transferred only once as a respective part of each said digital output data; and
(b) second means for maintaining color concentration characteristics of said thermal heads of said printing apparatus within an acceptable range according to said digital output data from said first means which heat respective ones of said thermal elements substantially in correspondence to the magnitude of said digitalized tone data received by said first means;
wherein said printing of said image is accomplished with a greater number of available tone levels than the number of said reference tone levels, whereby the amount of data required to be transferred from said first means to said second means for printing each said line is substantially reduced in comparison to the case where the number of reference tone levels 2 to the power of n, n being the number of all the bits available for each said digitized tone data.

6. A circuit as recited in claim 5, wherein said first means comprises:
third means for storing the digitized tone data of the whole image frame in a frame memory and for storing the digitized tone data per line of the whole image frame in a line memory;
fourth means for receiving predetermined most-significant digits of the digitized tone data per horizontal line of the whole image frame derived from said third means and for converting said predetermined most-significant digits into a first pulse-width converting signal based on a first unit time duration; and
fifth means for converting the rest of the digits of the digitized tone data derived from said third means into a second pulse-width converting signal based on a second unit time duration and said digits' binary weight.

7. A circuit as recited in claim 6, wherein said second means comprises drive circuitry for generating a thermal head drive signal so as to provide said color concentration characteristics of the thermal head of the printing apparatus in said acceptable range, in accordance with said first and second pulse-width converting signals.

8. A circuit as recited in claim 6, wherein said fourth means includes a half-tone generator for generating reference half-tone signals according to an analyzed number of tones and a magnitude comparator connected to the third means and the half-tone generator for sequentially comparing the predetermined significant digits of the digitized tone data with the reference half-tone signals.

9. A circuit as recited in claim 6, wherein said fifth means includes a data selector for selectively outputting the rest of the digits of the digitized tone data derived from said third means and each said first pulse-width converting signal.

10. A circuit as recited in claim 9, wherein said fifth means includes a pulse generator which generates a pulse signal having a pulse-width which decreases according to the weight of each of the rest of the digits of the digitized tone data and a gate circuitry which adds the rest of the digits of the digitized tone data outputted from the data selector to the pulse signal generated by the pulse generator so as to produce the second pulse-width converting signal.

11. A circuit as recited in claim 10, wherein;
said second means comprises drive circuitry for generating a thermal head drive signal so as to provide said color concentration characteristics of the thermal head of the printing apparatus in said acceptable range, in accordance with said first and second pulse-width converting signals; and
said drive circuitry includes a latch circuit which sequentially latches the rest of the digits of the digitized tone data and first pulse-width converted signal and which sequentially outputs the latched data and signal to said gate circuitry.

12. A circuit as recited in claim 8, wherein the digitized tone data has five digits and said half-tone generator comprises a sixteen-bit half-tone counter.

13. A circuit as recited in claim 8, wherein the digitized tone data has six digits and said half-tone generator comprises a sixteen-bit half-tone counter.

14. A circuit as recited in claim 12, wherein the upper four digits of the digitized tone data are compared with four bits of the reference half-tone signals of the half-tone signals generator in magnitude by means of said magnitude comparator.

15. A method for controlling a thermal head of a printing apparatus, comprising the steps of:
(a) storing digitized image tone data;
(b) converting a predetermined number of the lower digits of the digitized tone data into a sub pulse-width converting signal;
(c) converting the remaining upper digits of the digitized tone data into a main pulse-width converting signal; and
(d) generating a pulse-width modulated head driving signal for the thermal head in accordance with the main pulse-width converting signal and sub pulse-width converting signal.

* * * * *